US009317313B2

(12) United States Patent
Srinivasan (10) Patent No.: US 9,317,313 B2
(45) Date of Patent: Apr. 19, 2016

(54) DYNAMICALLY PROVISIONING STORAGE WHILE IDENTIFYING AND DISCARDING REDUNDANT STORAGE ALERTS

(71) Applicant: Microsoft Corporation, Redmond, WA (US)

(72) Inventor: Kattiganehalli Y. Srinivasan, Princeton Junction, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 13/899,568

(22) Filed: May 22, 2013

(65) Prior Publication Data

US 2014/0351808 A1 Nov. 27, 2014

(51) Int. Cl.
*G06F 9/455* (2006.01)
*G06F 3/06* (2006.01)
*G06F 9/44* (2006.01)

(52) U.S. Cl.
CPC ............ *G06F 9/45545* (2013.01); *G06F 3/067* (2013.01); *G06F 3/0608* (2013.01); *G06F 3/0644* (2013.01); *G06F 3/0665* (2013.01); *G06F 9/44* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 7,743,222 B2 | 6/2010 | Allen et al. | |
| 8,171,201 B1 * | 5/2012 | Edwards, Sr. .................. | 711/6 |
| 2007/0150690 A1 * | 6/2007 | Chen et al. .................... | 711/170 |
| 2010/0198972 A1 | 8/2010 | Umbehocker | |
| 2010/0299489 A1 * | 11/2010 | Balachandriah et al. ..... | 711/162 |
| 2011/0154329 A1 | 6/2011 | Arcese et al. | |
| 2011/0283279 A1 * | 11/2011 | Graves ................ | G06F 9/44589 718/1 |
| 2012/0254567 A1 | 10/2012 | Umbehocker | |
| 2014/0040997 A1 * | 2/2014 | Anantharaju ..................... | 726/5 |
| 2014/0189682 A1 * | 7/2014 | Crudele et al. ................. | 718/1 |

OTHER PUBLICATIONS

"International Search Report & Written Opinion for PCT Application No. PCT/US2014/039045", Mailed Date: Aug. 21, 2014, 11 Pages.
"Nagios XI—Resizing the VM Disk Size", Published on: Dec. 2012, Available at: http://assets.nagios.com/downloads/nagiosxi/docs/Resizing_The_XI_VM_Disk.pdf.
PCT Application No. PCT/US2014/039045, Response and Amendment to International Search Report and Written Opinion, dated Dec. 4, 2014, 18 pages.
Karlsson, et al., "Triage: Performance Differentiation for Storage Systems Using Adaptive Control", In Journal of ACM Transactions on Storage, vol. 1 Issue 4, Nov. 2005, pp. 457-480.
Lim, et al., "Automated Control for Elastic Storage", In Proceedings of the 7th International Conference on Autonomic Computing, Jun. 7, 2010, pp. 1-10.

(Continued)

*Primary Examiner* — Meng An
*Assistant Examiner* — Michael Ayers
(74) *Attorney, Agent, or Firm* — Henry Gabryjelski; Kate Drakos; Micky Minhas (57) ABSTRACT

A "just in time" feedback-driven strategy for provisioning storage in a cloud computing environment is described. An agent miming in a guest virtual machine can monitor the storage needs of the guest virtual machine. When a specified threshold for the guest virtual machine is reached, the host can be notified of the changing storage needs. The host can respond by re-sizing the storage device and notifying the guest virtual machine of the changed storage capacity.

16 Claims, 5 Drawing Sheets

(56) References Cited

OTHER PUBLICATIONS

Konstantinou, et al., "Tiramola: Elastic NoSQL Provisioning Through a Cloud Management Platform", In Proceedings of the ACM SIGMOD International Conference on Management of Data, May 20, 2012, pp. 725-728.

Buyya, et al., "InterCloud: Utility-Oriented Federation of Cloud Computing Environments for Scaling of Application Services", In Proceedings of the 10th International Conference on Algorithms and Architectures for Parallel Processing, vol. Part I, May 21, 2010, pp. 13-31.

Eilam, et al., "Using a Utility Computing Framework to Develop Utility Systems", In Journal of IBM Systems, vol. 43, Issue 1, Jan. 2004, pp. 97-120.

"International Preliminary Report on Patentability Issued in PCT Application No. PCT/US2014/039045 (foreign counterpart application to U.S. Appl. No. 13/899,568)", Mailed Date: Aug. 5, 2015, 8 Pages.

European Patent Application No. 14736077.0 (foreign counterpart application to U.S. Appl. No. 13/899,568), Communication pursuant to Rule 161(1) and 162 EPC, dated Mar. 8, 2016, 14 Pages.

* cited by examiner

DYNAMICALLY PROVISIONING STORAGE WHILE IDENTIFYING AND DISCARDING REDUNDANT STORAGE ALERTS

BACKGROUND

Cloud computing is a term that is used to refer to accessing remote computing resources provided by someone other than the user, using a network. The computing resources provided can include hardware, software or a combination of both. Typically the user is charged for the services accessed using a pay-per-use model. The most common network used to access remote computing resources is the Internet. Cloud-based services can be accessed using a web browser or a light-weight desktop or mobile application. Cloud computing shares the resources of a single physical computer with more than one user. For example a server "in the cloud" may store the data for several or many customers on the same physical computer.

A cloud typically includes a number of physical computers that appear to a user to be a single computer. The computers of the cloud are typically virtualized (made into virtual machines) to maximize resource usage. A single virtualized computer can appear to a user to be a number of physical computers. A virtual machine shares the resources of a single physical computer among multiple different virtual computing environments.

SUMMARY

A "just in time" or as-needed feedback-driven strategy for provisioning virtual storage on a virtual machine is described. The strategy may be implemented in a cloud computing environment. An agent running on a guest virtual machine (VM) can monitor storage usage by the guest VM. When a specified threshold of storage utilization is reached, the host can be notified. The host can respond by re-sizing (changing the size or capacity of) the virtual storage device while the processes of the guest VM are executing, without interrupting execution on the guest VM. The host can notify the guest VM that the storage capacity of the virtual storage device has changed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Dynamic storage management refers to the ability to automatically (that is, programmatically without human intervention) increase or decrease the amount of storage available to a user based on the user's needs, as the user's program is executing, without interrupting the execution of the user's program. A "just in time" feedback-driven strategy for provisioning virtual storage is described, where the amount of virtual storage provided to a guest VM adapts to the needs of the guest VM as the guest processes are running on the host. In accordance with aspects of the subject matter described herein, an agent limning on a guest VM can monitor the storage needs of one or more executing guest processes. When a specified storage utilization threshold for the guest VM is reached, the host can be notified. The host can respond by re-sizing the virtual storage device and notifying the guest VM that the storage allocation to the guest VM has changed.

A storage monitoring agent on the guest VM can periodically monitor the storage utilization by the guest VM. The storage monitoring agent can generate an alert when, for example, the free space on a virtual storage device falls below a certain threshold. Similarly, the agent can generate an alert when, for example, the free space exceeds a certain threshold on the specified virtual storage device. When the alert is generated, the agent can send the alert information to the host. Alert information can include at least: an identifier such as a GUID (Globally Unique IDentifier) that uniquely identifies a virtual storage device, the current size of the virtual storage device as detected by the guest VM, and the current utilization of the virtual storage device (as detected by the guest VM). Other information can also be included in the alert.

A communication channel between host and guest VM can be a private communication channel. For example, the storage alert can be sent to the host VM using a private communication channel. In some platforms, a private communication channel between host and guest VM can be based on a Key Value Pair (KVP). A KVP, also called a name-value pair, key-value pair, field-value pair or attribute-value pair refers to a mechanism that includes a group of key identifiers and a set of associated values. Key-value pairs are expressed as a collection of tuples where each tuple is a key and its value. In some platforms including but not limited to Microsoft's WINDOWS® platforms, a private channel for exchanging data between a host and a guest VM running on the host computer can be implemented by exchanging key-value tuples.

The virtual storage device used by the guest VM may be a device that is shared among multiple co-operating virtual machines hosted on the same physical node. In a network a physical node is an active electronic device attached to the network that is capable of sending, receiving, or forwarding information over a communications channel. A node can be a computing node including but not limited to a bridge, a switch, or a host computer including but not limited to a router, a workstation or a server. If guest VMs sharing the virtual storage device are hosted on the same node in the network, the host may receive multiple storage alerts for the same virtual storage device.

In response to receiving more than one storage alert for the same virtual storage device, the host can process the alerts serially, (one at a time). Handling multiple alerts serially can enable the host to discard multiple guest VMs' alerts about the same virtual storage device because, for example, addressing one of the alerts may satisfy the needs of all the VMs sharing the storage device. If multiple guest VMS send alerts for the same virtual storage device, re-sizing the storage device by, for example, expanding the storage device for the guest VM sending the first alert also expands the storage device for the other guest VMs who sent alerts for that device. In response determining that the current size of the storage device as determined by the host does not match the current size for the virtual storage device as specified in the storage alert, the host may be able to discard the alert because the virtual storage device has already been expanded. In response to determining that the current size of the virtual storage device matches the current size specified in the storage alert, the virtual storage device can be re-sized based on the storage provisioning policy. The guest VM sending the storage alert can be notified of the results of the re-sizing operation. Other guest VMs that share the re-sized virtual storage device can also be notified of the results of the re-sizing operation.

In some platforms, when the characteristics of a device such as a virtual storage device change, all the guest VMS that currently have access to the virtual storage device can be notified. In response to the notification from the host, the guest VM or guest VMs can rescan the bus connecting the guest VM to the storage device to rediscover or re-detect the virtual storage device to receive the new characteristics of the virtual storage device. The guest VM may need to notify a file system miming on the guest VM of the new storage characteristics because the file system may have to rebuild data structures, etc. to be able to utilize the re-sized storage space correctly.

Similarly, if the allocated storage space is under-utilized, one or more guest VMS may send an underutilization storage alert for the virtual storage device. In response the storage device can be re-sized by decreasing the size of the virtual storage device for the guest VM.

Dynamically Provisioning Storage

Figure 1A:
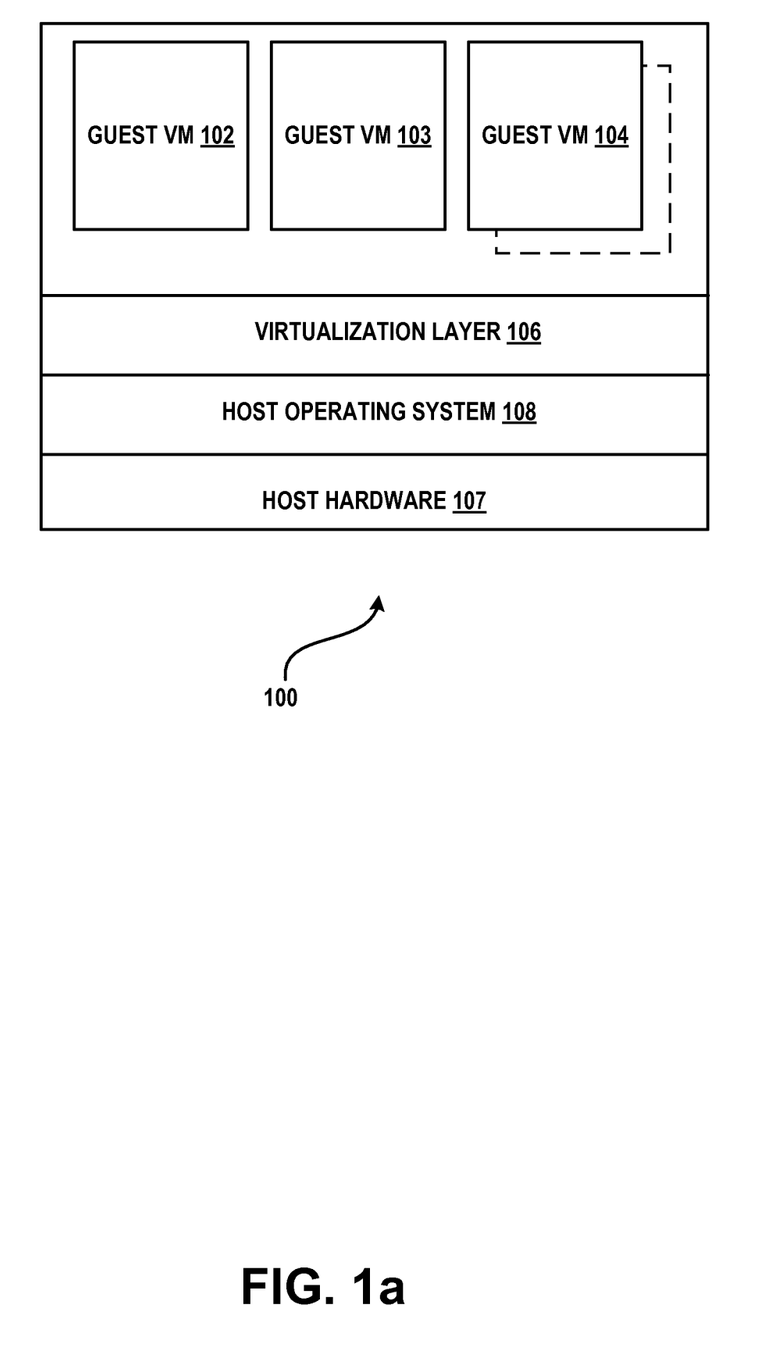
FIG. 1a illustrates an example of a virtual machine 100.

FIG. 1a illustrates an example of a virtual machine 100. A virtual machine (VM) such as virtual machine 100 is a software implementation of a computing environment in which one or more guest operating systems (OS) can be installed to create a guest VM such as guest VM 102, guest VM 103 and/or guest VM 104, etc. can be installed and run. A virtual machine is used to create a virtual environment that typically emulates a physical computing environment in a process referred to as "virtualization". Requests from a guest VM for hardware resources such as CPU (central processing unit) time, memory, storage, network and other resources (collectively, host hardware 107) are managed by virtualization software, depicted in FIG. 1a as virtualization layer 106. The virtualization layer translates guest requests to the underlying host hardware. The virtualization layer 106 can include a hypervisor or a virtualization platform.

Virtual machines for the guest processes are typically created within the virtualization layer, that runs on top of a client or server OS. The host OS is illustrated in FIG. 1a by host operating system 108. The virtualization layer can create one or more individual, isolated VM environments (such as, for example, guest VM 102, guest VM 103, guest VM 104, etc.). Some types of virtualization allow a user to run multiple operating systems on one computer at the same time. A VM can also function for a single program, allowing one application to function in an isolated way. Multiple computers can be set up to function as one computer through virtualization, allowing the virtualized system to draw on greater resources than might otherwise be available.

Figure 1B:
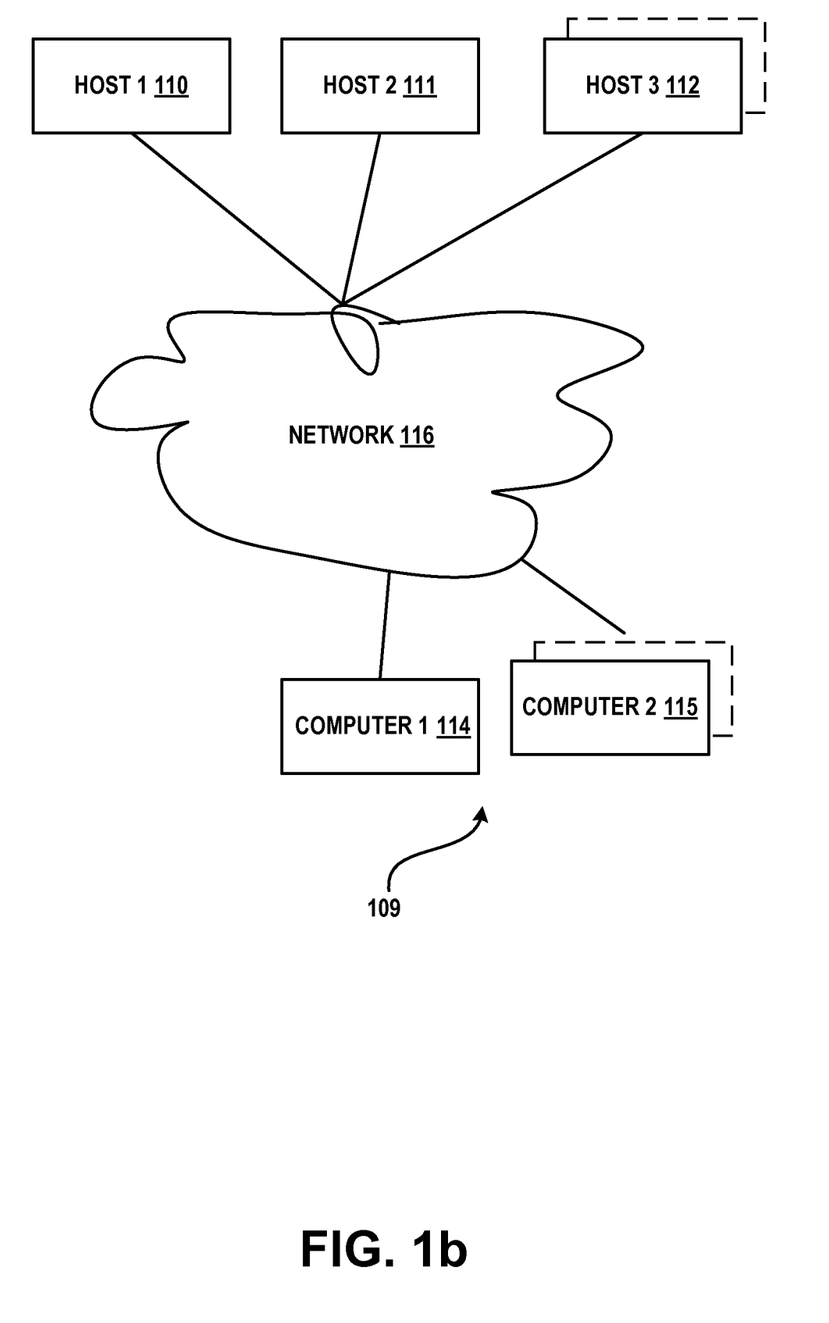
FIG. 1b illustrates an example of a cloud computing environment 109.

FIG. 1b illustrates an example of a cloud computing environment. A cloud computing environment is a computing environment in which computing services are not owned by the requester but are provided on demand using a network. In FIG. 1b a cloud computing system such as system 109 may include one or more host computers such as host 1 110, host 2 111, host 3 112, etc. Host 1 110, host 2 111, host 3 112, etc. can be virtual machines. System 109 may also include other non-virtualized computers (not shown). Computers such as requesting computer 1 114, requesting computer 2 115, etc. can request services from the one or more host computers via a network 116. Requesting computer 1 114, requesting computer 2 115, etc. can be virtual machines or non-virtualized machines. Network 116 can be the Internet or any kind of network.

Figure 1C:
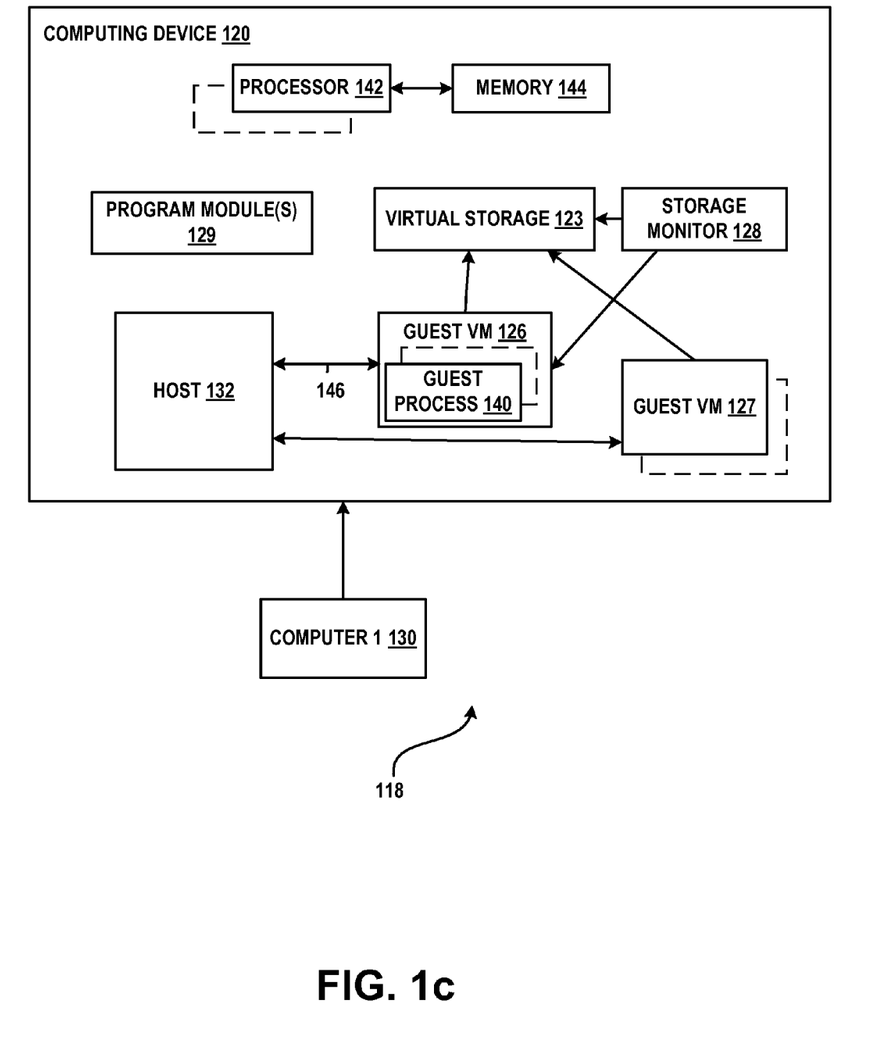
FIG. 1c illustrates an example of a system 118 that dynamically provisions storage in accordance with aspects of the subject matter disclosed herein.

FIG. 1c illustrates a system 118 for dynamically provisioning storage in accordance with aspects of the subject matter disclosed herein. As used herein "dynamically provisioning storage" means providing or equipping a user with storage such as but not limited to virtual storage while one or more user processes are executing, without terminating or stopping the user process(es) in order to provide additional storage. All or portions of system 118 may comprise one or more computers such as the computers described below with respect to FIG. 3. All or portions of system 118 may comprise one or more virtual machines such as the virtual machine described above with respect to FIG. 1a.

System 118 may include one or more computers or computing devices such as a computing device 120. Computing device 120 can be any type of stationary or mobile computing device, including a desktop computer (e.g., a personal computer, etc.), a mobile computer or computing device (e.g., a PALM® device, a RIM BLACKBERRY® device, a personal digital assistant (PDA), a laptop computer, a notebook computer, a tablet computer (e.g., an Apple IPAD™), a netbook, etc.), a mobile phone (e.g., a cell phone, a smart phone such as an Apple iPhone, a Google ANDROID™ phone, a Microsoft WINDOWS® phone, etc.), or other type of mobile device. System 118 or portions thereof may include information obtained from a service (e.g., in the cloud) and/or may operate in a cloud computing environment. A cloud computing environment can be an environment in which computing services are not owned but are provided on demand. For example, information may reside on multiple devices in a networked cloud and/or data can be stored on multiple devices within the cloud.

A computer such as computing device 120 can comprise: one or more processors such as processor 142, etc., a memory such as memory 144 and one or more program modules for dynamically provisioning storage. It will be appreciated that the one or more program modules such as, by way of example but not limitation, program modules such as program module(s) 129 that dynamically provision storage as described herein, can be loaded into memory 144 to cause one or more processors such as processor 142, etc. to perform the actions attributed to the one or more modules that dynamically provision storage.

Computing device 120 can be a virtualized computer or virtual machine as described above with respect to FIG. 1a. Computing device 120 can be a computer that is not virtualized. Computing device 120 can include a host. The computer on which the host resides can be a host computer. The service may involve the use of storage (e.g., disk storage). The storage capacity provided for the service can be storage space provided on a disk. The storage capacity provided for the service can be on a physical disk or can be storage space provided on a virtual storage device such as virtual storage device 123. A request for a service can be sent by computer 130 and can be received by computing device 120 via a network (not shown). In response computing device 120 (a host computer) can set up an execution environment implemented as a virtual machine for a guest operating system such as guest VM 126 for the requested service on the host computer. The execution environment for the guest computer can be allocated a specified or otherwise known amount of storage space on a virtual storage device such as virtual storage device 123.

One or more guest processes such as guest process 140 can start to execute on the host compute in guest VM 126. The guest process 140 can be periodically monitored by a storage monitoring agent such as storage monitor 128 associated with a guest VM such as guest VM 126. When the storage monitor 128 detects that a specified threshold of available storage space on virtual storage device 123 has been reached for the guest VM 126, the storage monitor 128 can notify the host 132. For example, the storage monitor 128 can generate an alert when the free space falls below a certain threshold on virtual storage device 123. When the alert is generated, the storage monitor 128 can send the alert information to the host 132. Alert information can include at least: an identifier such as a GUID (Globally Unique IDentifier) that uniquely identifies a storage device such as virtual storage device 123, the current size of the storage device as detected by the guest VM and the current utilization of the virtual storage device (as detected by the guest VM). Other information can also be included in the storage alert, such as but not limited to an identifier of the guest VM sending the message.

The storage alert can be sent to the host 132 using a private communication channel such as communication channel 146. In some platforms, a private communication channel 146 between host 132 and guest VM 126 can be based on a Key Value Pair (KVP). A KVP, also called a name-value pair, key-value pair, field-value pair or attribute-value pair refers to a mechanism that includes a group of key identifiers and a set of associated values. Key-value pairs are expressed as a collection of tuples where each tuple is a key and its value. In some platforms such as but not limited to the Microsoft WINDOWS® platforms, a private channel for exchanging data between the host and guest VMs running on the host is implemented by exchanging key-value tuples.

The virtual storage device 123 used by the guest VM 126 may be a device such as a disk or virtual disk that is shared among multiple co-operating virtual machines hosted on the same physical node. For example, virtual storage device 123 may be shared by guest VM 126 and guest VM 127, etc. In a network, a physical node is an active electronic device attached to the network that is capable of sending, receiving, or forwarding information over a communications channel. A node can be a computing node including but not limited to a bridge, a switch, or a host computer including but not limited to a router, a workstation or a server. If the virtual machines sharing the storage device are hosted on the same node in the network, the host may receive multiple storage related alerts for the same storage device.

In response to receiving one or more storage alerts for the same storage device, the host can process the alerts serially, one at a time. Handling multiple alerts serially can enable the host to discard one or more guest VMs' alerts about the same virtual storage device because addressing one of the alerts may satisfy the needs of other guest VMs sharing the virtual storage device. For example, re-sizing the virtual storage device by expanding the virtual storage device for the VM sending the first alert also expands the virtual storage device for the other VMs who sent alerts for that virtual storage device. To determine if the alert has already been addressed, the current size of the storage device can be compared to the size of the virtual storage device reported in the alert. In response to determining that the current size of the storage device does not match the current size specified in the alert message, the host VM can discard the alert. In response to determining that the current size of the storage device matches the current size specified in the storage alert, the virtual storage device can be re-sized while the guest VM process is executing, based on the storage provisioning policy. The guest VM can be notified of the results of the re-sizing operation.

In response to receiving the notification from the host, the guest can rescan the bus connecting the guest VM to the virtual storage device 123 to discover or detect the new characteristics of the virtual storage device. In some platforms, when the characteristics of a device change, the guest VM can rediscover or re-detect the device and receive the new characteristics for the storage device. The guest VM may need to have its file system rebuild data structures with the new storage space allocations to be able to utilize the re-sized storage space.

Figure 2:
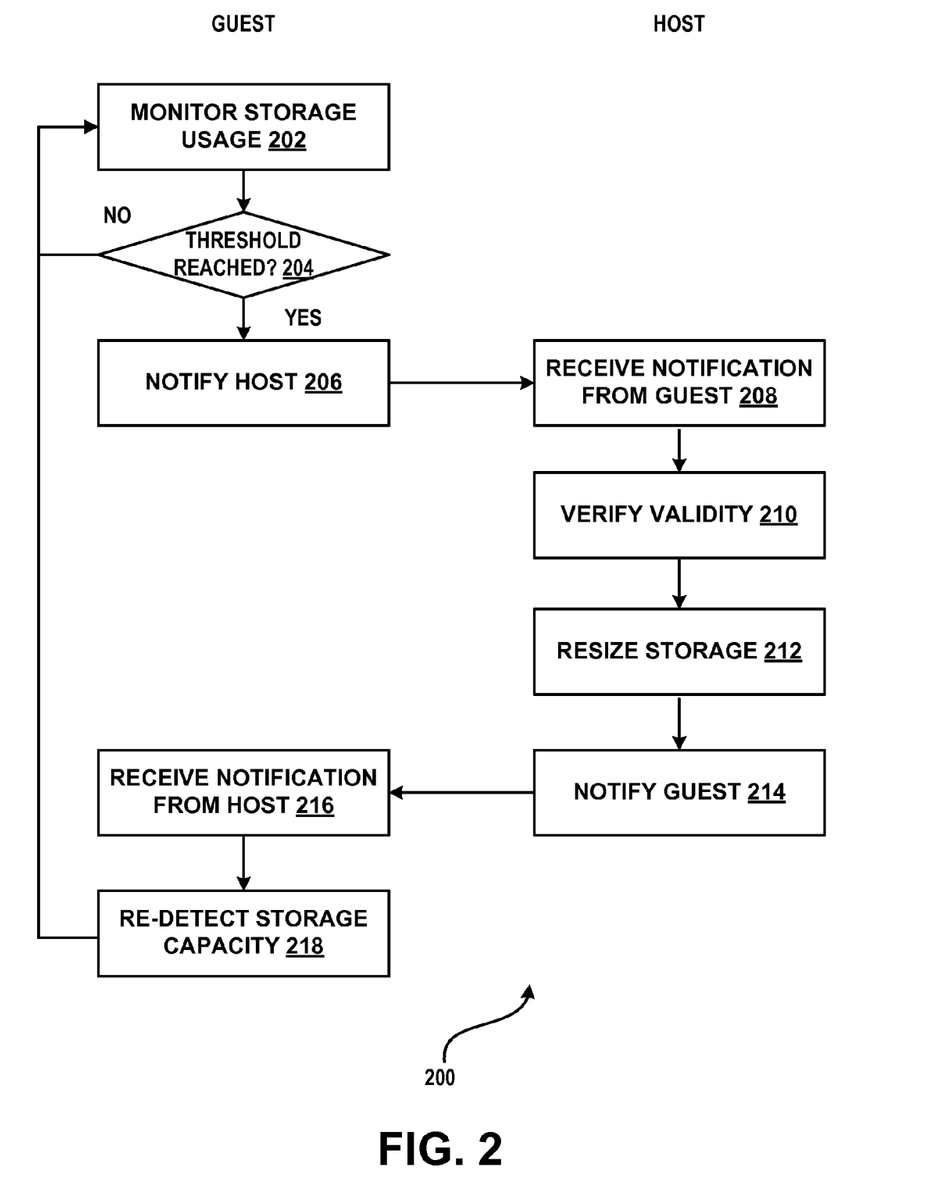
FIG. 2 illustrates an example of a method 200 that dynamically provisions storage in accordance with aspects of the subject matter disclosed herein.

FIG. 2 illustrates a method 200 for dynamically provisioning storage. The method described in FIG. 2 can be practiced by a system such as but not limited to the one described with respect to FIG. 1c. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed.

A host can receive a request for a service from another computer. The computer sending the request may be a VM but does not have to be a VM. The request can be sent via a network such as but not limited to a LAN, WAN or the Internet. The host can set up a guest VM to provide the requested service (e.g., run the requested application for the requesting computer). The requested service may be associated with storage needs. The host may set up a virtual storage device for the guest VM. A virtual storage device can be all or part of a physical storage device (e.g., a disk, etc.) for the guest VM process. The virtual storage device can be shared with other guest VMs running on the same network node. One or more guest processes in the guest VM can begin execution.

At operation 202 an agent running on the guest VM or associated with the guest VM can monitor the storage needs of the guest VM. The storage monitoring agent can be provided with one or more thresholds. The one or more thresholds may specify an upper utilization threshold which when reached, triggers an alert to be sent to the host that can result in re-sizing the virtual storage device to increase the amount of storage provided to the guest VM. The one or more thresholds may specify a lower utilization threshold which when reached, triggers a storage alert to be sent to the host that can result in re-sizing the virtual storage device to decrease the amount of storage provided to the guest VM. Periodically, the storage monitoring agent can determine the utilization of the virtual storage device by the guest VM at operation 204.

In response to determining that the specified threshold has been reached or exceeded for an upper utilization threshold, a message sent from the agent to the host can be triggered at operation 206. Similarly, at operation 206, the agent can generate a storage alert when the free space reaches or falls below a lower threshold on the specified virtual storage device. Alert information can include at least: an identifier such as a GUID (Globally Unique IDentifier) that uniquely identifies a storage device, the current size of the storage device as detected by the guest, the current utilization of this storage device (as detected by the guest). Other information can also be included in the alert. The alert can be sent to the host using a private communication channel. In some platforms, a private communication channel between host and guest can be based on a Key Value Pair (KVP). At 208 the message triggered by reaching the storage threshold can be received by the host.

At operation 210 validity of the message can be verified. For example, as described above, it is possible that one or more of multiple alerts received for the same virtual storage device can be discarded. At operation 212 the storage device can be re-sized. At operation 214 the guest VM can be notified that the virtual storage device has been re-sized. At operation 216 the guest VM can receive the message. At operation 218 the guest VM can re-detect storage availability and can notify its file system that its storage space has changed. The file system can rebuilt data structures. Method 200 is automated, requiring no human intervention. Method 200 does not terminate or interrupt processes executing on the guest VMs.

Example of a Suitable Computing Environment

Figure 3:
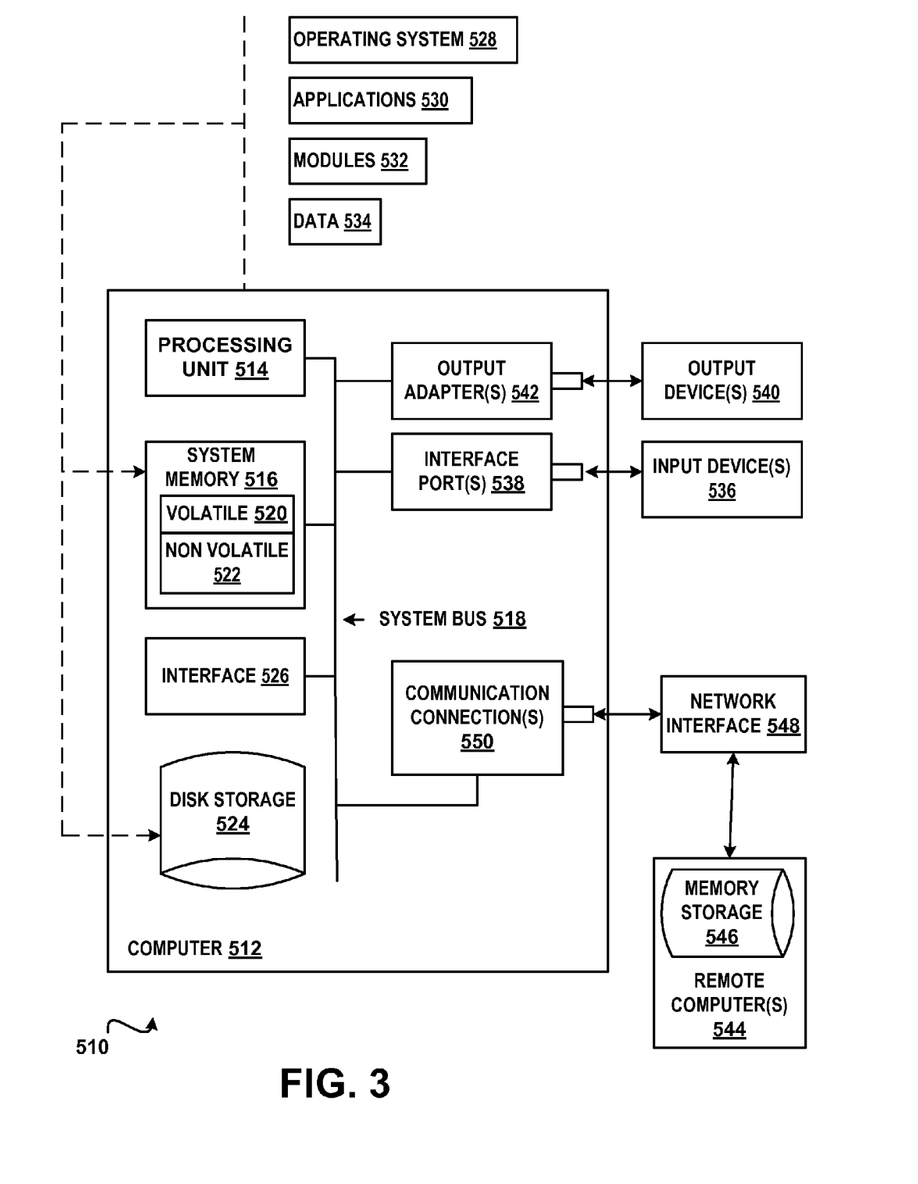
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage devices), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above.

What is claimed:

1. A computing device comprising:
   at least one processor;
   a memory;
   a host;
   a virtual storage device allocated to at least one guest virtual machine by the host, the at least one guest virtual machine executing at least one guest process;
   at least one module loaded into the memory causing the at least one processor to:
   monitor usage of the virtual storage device by the at least one guest virtual machine;
   receive via a private channel by the host, a storage alert from the at least one guest virtual machine running on the host in response to monitoring that the usage of the virtual storage device has reached an upper or lower utilization threshold, the storage alert specifying a current usage and a current size of the virtual storage device allocated to the at least one guest virtual machine by the host at a time the storage alert was sent;
   in response to determining that the current size of the virtual storage device specified in the storage alert matches a size of the virtual storage device allocated to the at least one guest virtual machine by the host, re-size by increasing or decreasing the size of the virtual storage device allocated to the at least one guest virtual machine, depending on whether an upper or lower utilization threshold was reached, while the at least one guest process continues executing without interruption, and
   in response to determining that the current size of the virtual storage device specified in the storage alert does not match a size of the virtual storage device allocated to the at least one guest virtual machine by the host, discard the storage alert.

2. The computing device of claim 1, wherein the storage alert comprising: an identifier identifying the virtual storage device allocated to the at least one guest virtual machine.

3. The computing device of claim 1, wherein the at least one module loaded into the memory causing the at least one processor to: send a notification via the private channel from the host to the at least one guest virtual machine, the notification notifying the at least one guest virtual machine of the re-sizing of the virtual storage device.

4. The system of claim 1, further comprising: at least one module loaded into the memory causing the at least one processor to: send the storage alert via a private channel implemented by a key-value pair mechanism.

5. The computing device of claim 3, further comprising: in response to receiving the notification from the host at the at least one guest virtual machine, re-detecting the virtual storage device to receive new characteristics of the virtual storage device; and rebuilding a file system associated with the at least one guest virtual machine.

6. A method comprising:
   monitoring usage of a virtual storage device allocated to a guest virtual machine executing at least one process on a host;
   sending a storage alert to the host via a private channel between the guest virtual machine and the host in response to monitoring that the usage of the virtual storage device has reached an upper or lower utilization threshold, the storage alert specifying a current usage and a current size of the virtual storage device allocated to the at least one guest virtual machine by the host at a time the storage alert was sent;
   in response to determining that the current size of the virtual storage device specified in the storage alert matches a size of the virtual storage device allocated to the at least one guest virtual machine by the host, re-sizing by increasing or decreasing the size of the virtual storage device allocated to the at least one guest virtual machine, depending on whether an upper or lower utilization threshold was reached, while the at least one guest process continues executing without interruption, and
   in response to determining that the current size of the virtual storage device specified in the storage alert does not match a size of the virtual storage device allocated to the at least one guest virtual machine by the host, discarding the storage alert.

7. The method of claim 6, wherein the private channel is implemented via a key-value pair mechanism.

8. The method of claim 6, the storage alert comprising: an identifier identifying the virtual storage device allocated to the at least one guest virtual machine.

9. The method of claim 6, wherein the host executes in a cloud computing environment.

10. The method of claim 6, further comprising: sending a re-sizing notification for the re-sized virtual storage device to a plurality of guest virtual machines, the re-sized virtual storage device allocated to the plurality of guest virtual machines.

11. A machine-readable storage medium comprising computer-executable instructions which when executed cause at least one processor of a computing device to:
    monitor usage of a virtual storage device allocated to a guest virtual machine executing at least one process on a host computer;
    send a storage alert to a host executing on the host computer, via a private channel between the guest virtual machine and the host in response to monitoring that the usage of the virtual storage device has reached an upper or lower utilization threshold, the storage alert specifying a current usage and a current size of the virtual storage device allocated to the at least one guest virtual machine by the host at a time the storage alert was sent;
    in response to the host determining that the current size of the virtual storage device specified in the storage alert matches the size of the storage device allocated to the at least one guest virtual machine by the host, re-size by increasing or decreasing the size of the virtual storage device allocated to the at least one guest virtual machine, depending on whether an upper or lower utilization threshold was reached, while the at least one process continues executing without interruption; and
    in response to determining that the current size of the virtual storage device specified in the storage alert does not match a size of the virtual storage device allocated to the at least one guest virtual machine by the host, discard the storage alert.

12. The machine-readable storage medium of claim 11, comprising further computer-executable instructions, which when executed cause the at least one processor to: in response to receiving the notification from the host at the guest virtual machine, re-detect storage capacity of the virtual storage device.

13. The machine-readable storage medium of claim 11, comprising further computer-executable instructions, which when executed cause the at least one processor to: in response to receiving the notification from the host at the guest virtual machine, rebuild a file system on the guest virtual machine.

14. The machine-readable storage medium of claim 11, comprising further computer-executable instructions, which when executed cause the at least one processor to: implement the private communication channel based on a key-value pair mechanism.

15. The machine-readable storage medium of claim 11, comprising further computer-executable instructions, which when executed cause the at least one processor to: create the storage alert comprising: an identifier identifying the virtual storage device allocated to the at least one guest virtual machine.

16. The machine-readable storage medium of claim 11, comprising further computer-executable instructions, which when executed cause the at least one processor to: execute in a cloud computing environment.

\* \* \* \* \*